(12) United States Patent
Shroyer et al.

(10) Patent No.: US 11,845,490 B1
(45) Date of Patent: Dec. 19, 2023

(54) VEHICLE ALIGNMENT ASSEMBLY

(71) Applicant: Ford Global Technologies, LLC, Dearborn, MI (US)

(72) Inventors: Jared Shroyer, Madison Heights, MI (US); Shane Edward Foley, Milford, MI (US); Bojun Song, Royal Oak, MI (US); Geoff Lawrence Gordon, Novi, MI (US); Grant Warr, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/115,816

(22) Filed: Mar. 1, 2023

(51) Int. Cl.
*B62D 17/00* (2006.01)
*B60G 7/02* (2006.01)

(52) U.S. Cl.
CPC ............... *B62D 17/00* (2013.01); *B60G 7/02* (2013.01)

(58) Field of Classification Search
CPC .................................. B62D 17/00; B60G 7/02
See application file for complete search history.

(56) References Cited

U.S. PATENT DOCUMENTS

| | | | |
|---|---|---|---|
| 3,880,444 A * | 4/1975 | Bridges | B62D 17/00 280/86.753 |
| 3,960,388 A | 6/1976 | Strader et al. | |
| 4,616,845 A | 10/1986 | Pettibone | |
| 4,618,162 A | 10/1986 | Specktor et al. | |
| 4,863,187 A | 9/1989 | Artz | |
| 4,973,075 A | 11/1990 | Rori et al. | |
| 5,129,669 A * | 7/1992 | Specktor | B60G 11/28 280/86.753 |
| 5,301,977 A * | 4/1994 | Schlosser | B62D 17/00 280/86.757 |
| 7,125,026 B2 * | 10/2006 | Genick, II | F16B 35/041 280/86.753 |
| 7,370,868 B2 * | 5/2008 | Genick, II | F16B 35/041 280/86.753 |
| 7,891,679 B2 * | 2/2011 | Svartz | B60G 7/006 280/86.75 |
| 8,469,375 B2 | 6/2013 | Frens | |
| 8,979,105 B2 * | 3/2015 | McCarthy | B62D 17/00 29/428 |
| 9,073,577 B2 | 7/2015 | Croutcher | |
| 9,233,589 B1 * | 1/2016 | Miller | B60G 7/02 |

(Continued)

FOREIGN PATENT DOCUMENTS

| | | | | |
|---|---|---|---|---|
| CA | 2801650 A1 * | 7/2013 | ............. | B60G 7/02 |
| CA | 3027568 A1 * | 6/2019 | ............. | B25B 13/06 |

(Continued)

*Primary Examiner* — Nicole T Verley
(74) *Attorney, Agent, or Firm* — Lorne Forsythe; Price Heneveld LLP (57) ABSTRACT

An alignment assembly that includes a body that defines a bolt aperture and at least one pin aperture. A control arm is proximate the body and includes a bushing with a bushing aperture. A bolt extends through the bushing aperture and the bolt aperture. The bolt has a front portion and an end portion opposing the front portion. A flag nut is coupled to the end portion and includes a plate with at least one aperture. At least one pin extends through the at least one pin aperture and the at least one aperture. A position of the pin at least partially determines a position of the control arm.

20 Claims, 4 Drawing Sheets

(56) References Cited

U.S. PATENT DOCUMENTS

2006/0181044 A1* 8/2006 Zebolsky ............... B60G 9/003
  280/86.75
2012/0104713 A1* 5/2012 Frens .................... B60G 7/003
  280/86.75

FOREIGN PATENT DOCUMENTS

| DE | 102017111669 A1 * | 11/2018 | ............... F16B 2/12 |
| DE | 102020131375 A1 * | 6/2022 | |
| EP | 2783947 A1 * | 10/2014 | ............. B62D 17/00 |
| EP | 2594509 B1 * | 12/2014 | ............... B65G 9/00 |
| GB | 2244034 A * | 11/1991 | ............. B62D 17/00 |
| KR | 102452697 B1 * | 10/2022 | |
| WO | WO-2017095900 A1 * | 6/2017 | |

* cited by examiner

VEHICLE ALIGNMENT ASSEMBLY

FIELD OF THE DISCLOSURE

The present disclosure generally relates to camber, caster, or toe adjustment, in particular, a control arm adjustment in a vehicle.

BACKGROUND OF THE DISCLOSURE

Consumers often compare available features and functionality between vehicles when making a purchasing decision. Accordingly, additional solutions are needed that provide features and functionality that are desirable to consumers.

SUMMARY OF THE DISCLOSURE

According to a first aspect of the present disclosure, the present invention relates to an alignment assembly for a vehicle that includes a body that defines a bolt aperture and at least one pin aperture. A control arm is proximate the body and includes a bushing with a bushing aperture that extends through the bushing aperture. A bolt extends through the bushing aperture and the bolt aperture. A flag nut is coupled to the bolt. The flag nut comprises a plate with at least one aperture. At least one pin extends through the at least one pin aperture and the at least one aperture. The position of at least one pin at least partially determines a position of the control arm.

Embodiments of the first aspect of the present disclosure can include any one or a combination of the following features:
- a second nut coupled to the bolt and proximate the plate, and the second nut is configured to apply a force on the plate, and a position of the plate at least partially determines a position of the control arm;
- the plate comprises an outer surface and an inner surface, and the outer surface abuts the second nut and the inner surface abuts the body;
- a spacer coupled to the inner surface;
- at least one aperture comprises a first aperture and a second aperture, and at least one pin comprises a first pin and a second pin, and the first aperture is configured to receive the first pin and the second aperture is configured to receive the second pin;
- the plate includes a bottom section, a top section, and a stepped section defined between the bottom section and the top section;
- the first aperture and the second aperture are defined at the top section;
- the top section defines a first corner and a second corner opposing the first corner, and the first aperture is defined proximate the first corner and the second aperture is defined proximate the second corner; and
- the body is a vehicle frame.

According to a second aspect of the present disclosure, the present invention relates to a vehicle frame that defines a bolt aperture and at least one pin aperture. A control arm is proximate the vehicle frame and includes a bushing with a bushing aperture that extends through a center portion of the bushing. A bolt extends through the bushing aperture. The bolt comprises a front portion and an end portion opposing the front portion. The front portion comprises a bolt head with a bottom surface that is configured to abut a first end surface of the bushing. The end portion is configured to extend through the bolt aperture. A flag nut is coupled to the end portion and includes a plate that defines at least one aperture. At least one pin extends through the at least one pin aperture and the at least one aperture. The position of the at least one pin at least partially determines a position of the control arm.

Embodiments of the second aspect of the present disclosure can include any one or a combination of the following features:
- a second nut coupled to the end portion and proximate to the plate, and where the second nut is configured to apply a force on the plate, and a position of the plate at least partially determines a position of the control arm;
- the plate comprises a bottom section, a top section, and a stepped section defined between the bottom section and the top section;
- at least one aperture comprises a first aperture and a second aperture, and at least one pin comprises a first pin and a second pin, and the first aperture is configured to receive the first pin and the second aperture is configured to receive the second pin;
- the first aperture and the second aperture are defined at the top section; and
- the top section defines a first corner and a second corner opposing the first corner, and where the first aperture is defined proximate the first corner, and the second aperture is defined proximate the second corner.

According to a third aspect of the present disclosure, the present invention relates to a vehicle. The vehicle includes a vehicle frame defining a bolt aperture and a pair of pin apertures. The vehicle further includes a control arm proximate the vehicle frame. A bushing is at an end of the control arm. The bushing defines a bushing aperture that extends through a center portion of the bushing. A bolt extends through the bushing aperture. The bolt comprising a front portion and an end portion opposing the front portion. The front portion comprises a bolt head with a bottom surface that is configured to abut a first end surface of the bushing. The end portion is configured to extend through the bolt aperture. The vehicle further includes a flag nut coupled to the end portion. The flag nut includes a plate defining a pair of apertures. The plate is comprised of a bottom section, a top section, a stepped section defined between the bottom section and the top section, and a spacer integrally coupled to an inner surface of the plate. A pair of pins extend through the pair of pin apertures and the pair of apertures. A position of each of the pair of pins at least partially determines a position of the control arm.

Embodiments of the third aspect of the present disclosure can include any one or a combination of the following features:
- the top section and the spacer are configured to abut the vehicle frame;
- a second nut coupled to the end portion and proximate the plate, and where the second nut is configured to apply a force on the plate, and where a position of the plate at least partially determines a position of the control arm;
- the plate comprises an outer surface and an inner surface, and the outer surface abuts the second nut; and
- the section defines a first corner and a second corner opposing the first corner, and each of the pair of apertures are respectively defined proximate the first corner and the second corner.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

Figure 1:
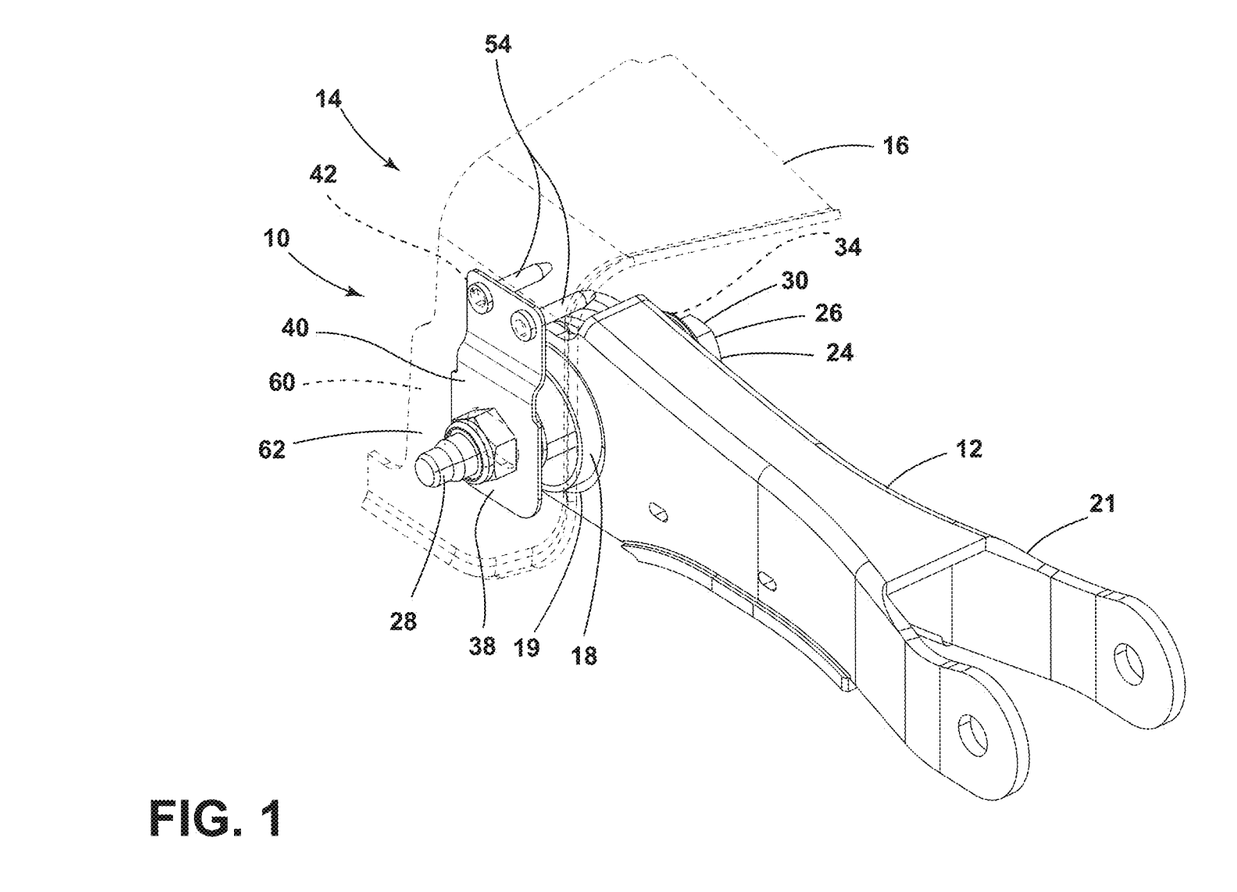
FIG. 1 is a top perspective view of a vehicle frame and control arm with an alignment assembly, according to one example.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to an alignment assembly for a vehicle. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring now to FIGS. 1-5, depicted is a control arm 12 proximate a portion of a vehicle frame 16 and having an alignment assembly 10. The alignment assembly 10 includes a bushing 18 at a first end 19 of the control arm 12 and a bushing aperture 20 extending through a center portion 22 of the bushing 18. A bolt 24 extends through the bushing aperture 20. The bolt 24 includes a front portion 26 and an end portion 28 opposing the front portion 26. The front portion 26 includes a bolt head 30 with a bottom surface 32 that abuts a first end surface 34 of the bushing 18 and the end portion 28 extends through a bolt aperture 36 defined on the frame 16. A flag nut 38 is coupled to the end portion 28. The flag nut 38 includes a plate 40 that defines a pair of apertures 42. The plate 40 is further comprised of a bottom section 44, a top section 46, a stepped section 48, and a spacer 50 integrally coupled to an inner surface 52 of the plate 40. A pair of pins 54 extend through a pair of pin apertures 56 defined on the frame 16 and the pair of apertures 42 defined on the plate 40. The position of each of the pair of pins 54 at least partially determines a position of the control arm 12.

Figure 2:
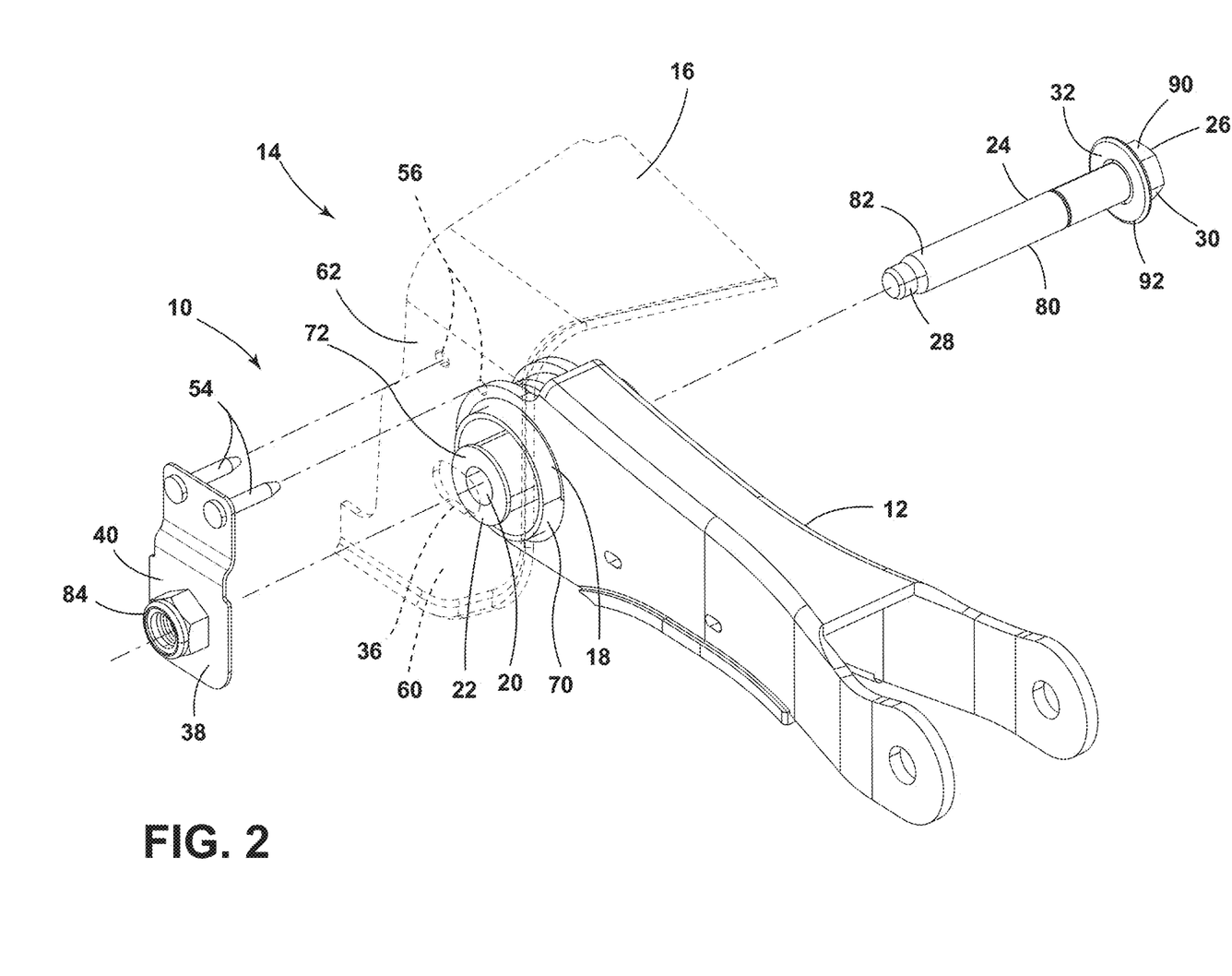
FIG. 2 is a partially exploded, top perspective view of a vehicle frame and control arm with an alignment assembly, according to one example.

In various examples, the control arm 12 may be one of various control arms 12 disposed in a vehicle 14. For example, the control arm 12 may be a part of a rear suspension assembly and is coupled to a rear tire wheel hub or part of a front suspension assembly and is coupled to a front tire wheel hub. Additionally, the control arm 12 may be the control arm 12 of a sedan, a sport utility vehicle, a truck, a van, a crossover, and/or other styles of vehicle. The control arm 12 may be the control arm 12 of a manually operated vehicle (e.g., with a human driver), a fully autonomous vehicle (e.g., no human driver), or a partially autonomous vehicle (e.g., may be operated with or without a human driver). It is also generally contemplated that the control arm 12 may be one of other various forms of control arms, such as a camber link, an adjustable control arm, a component of a vehicle suspension system, or various other vehicle 14 components. For example, the control arm 12 may be a link, such as a camber link, as illustrated in FIGS. 1 & 2. In other examples, the control arm 12 may be another link, such as a link that may affect caster and/or toe of the wheel hub. In yet other examples, the control arm 12 may be a wishbone control arm. For example, the control arm 12 may be a wishbone control arm with a pair of bushings 18 and a pair of alignment assemblies 10 facing each other.

According to various examples, the control arm 12 is coupled to a wheel hub of the vehicle 14. The control arm 12, in some examples, has the first end 19 that extends from the vehicle chassis or frame 16 and has a second end 21 with a bracket that connects to an interior portion of the wheel hub. Accordingly, the control arm 12, namely the position of the control arm 12, may affect the degree of camber, caster, and/or toe of the wheel hub and subsequently the wheel. Furthermore, such position of the control arm 12 may be adjusted to adjust degree of camber, caster, and/or toe of the wheel hub, as provided herein.

Referring to FIGS. 1 and 2, the alignment assembly 10 is coupled to the body 16, shown and described herein as being a portion of the vehicle frame 16. In some embodiments, the body 16 may define a first surface 60 and a second surface 62. In other examples, the body 16 may define the bolt aperture 36 extending from the first surface 60 to the second surface 62. The bolt aperture 36 may be generally defined as a circular shape or a slotted shape, where the slotted shape permits adjustment of the bolt 24. In yet other examples, the body 16 may define at least one pin aperture 56 extending from the first surface 60 to the second surface 62. For example, the body 16 may define a first pin aperture 56 and a second pin aperture 56 proximate the first pin aperture 56, as illustrated in FIGS. 1 and 2. Additionally, it is generally contemplated that the body 16 may define a first pair of pin apertures 56 and a second pair of pin apertures 56, wherein the second pair of pin apertures 56 are each spaced apart from each of the first pair of pin apertures 56. For example, the first pair of pin apertures 56 may be defined on the body 16 and the second pair of pin apertures 56 may be defined next to the first pair of pin apertures 56 such that each of the second pair of pin apertures 56 are proximate each of the first pair of pin apertures 56 and the flag nut 38 may be shifted to align with either pair of pin apertures 56. Accordingly to various examples, the body 16 is configured to permit coupling of various alignment assembly 10 components to the body 16, as provided herein.

Referring to FIGS. 1 and 2, the alignment assembly 10 includes the bushing 18 at a first end 19 of the control arm 12. The bushing 18 may include a sleeve 70, the center portion 22, and the first end surface 34 and a second end surface 72 on opposing ends of the center portion 22. In some examples, the bushing 18 defines the bushing aperture 20 at the center portion 22, wherein the bushing aperture 20 may extend from the first end surface 34 to the second end surface 72, as illustrated in FIGS. 1 and 2. According to various examples, the bushing 18 operably receives the bolt 24 and permits extension of the bolt 24 through the bushing aperture 20. Once the bolt 24 is fastened to the flag nut 38, the second end surface 72 of the bushing 18 abuts the first surface 60 of the body 16. Additionally, it is generally contemplated that the bushing 18 may be one of various kinds of bushings, such as a hydraulic bushing, a rubber bushing, a polyurethane bushing, or other kinds of bushings.

Referring to FIGS. 1 and 2, the alignment assembly 10 includes the bolt 24. The bolt 24 may be inserted within the bushing aperture 20 and extends through the bolt aperture 36. In some examples, the bolt 24 comprises the front portion 26, the end portion 28 opposing the front portion 26, and a middle portion 80 between the front portion 26 and the end portion 28. As illustrated in FIGS. 1 and 2, the front portion 26 may be proximate the first end surface 34 of the bushing 18 and extend into the bushing aperture 20. The middle portion 80 may be disposed within the bushing aperture 20, and the end portion 28 may extend through the bushing aperture 20 and the bolt aperture 36. In other examples, the end portion 28 may include threading 82 defined around an outer periphery of the end portion 28. The threading 82 defined on the end portion 28 may have a thread count, size, and pitch that coincides with threading 82 defined on the flag nut 38 and a second nut 84, as provided herein.

As illustrated in FIGS. 1 and 2, the front portion 26 of the bolt 24 includes the bolt head 30. The bolt head 30 includes an engagement portion 90 with the bottom surface 32. In some examples, the engagement portion 90 may be one of various forms of bolt heads 30. For example, the engagement portion 90 may be a hexagonal head, as illustrated in FIGS. 1-2. According to various aspects, the engagement portion 90 is configured to engage with a driver and permit translation of a rotational force generated by the driver to the bolt 24.

Referring further to FIGS. 1 and 2, a washer 92 may be coupled to the engagement portion 90. In some examples, the washer 92 may be an integrally coupled to the engagement portion 90 and extend beyond an outer periphery of the engagement portion 90. For example, the bolt head 30 may be a hexagonal bolt head with an integrally formed washer 92, as illustrated in FIG. 2. According to various aspects, the washer 92 is configured to abut the first end surface 34 of the bushing 18. For example, once the bolt 24 engages with the flag nut 38 and the second nut 84, the bolt 24 may be tightened via the driver such that the bottom surface 32 of the washer 92 abuts the first end surface 34 of the bushing 18.

Referring to FIGS. 1-5, the alignment assembly 10 includes the flag nut 38. The flag nut 38 may define a threaded section 100. In some examples, the threaded section 100 may be defined on an inner sidewall 102 that encompasses an opening 104 defined on the plate 40. According to various aspects, the threaded section 100 operably engages with the threading 82 defined on the end portion 28 of the bolt 24. It is generally contemplated that the threaded section 100 may have a thread count, size, and pitch that coincides with the threading 82 defined on the end portion 28 of the bolt 24 such that the threading 82 may engage with the threaded section 100.

Referring again to FIGS. 1-5, the flag nut 38 includes the plate 40. The plate 40 may be coupled to the end portion 28 of the bolt 24 and abut the second surface 62 of the body 16. The plate 40 may further include the bottom section 44, the top section 46 opposite the bottom section 44, and the stepped section 48 between the bottom section 44 and the top section 46. In some embodiments, the bottom section 44 may be generally coplanar with the body 16 and the top section 46 may be generally coplanar with the body 16. In other examples, the top section 46 may abut the body 16 and the bottom section 44 may abut the body 16, or the bottom section 44 may be spaced apart from the body 16. In yet other examples, the top section 46 may be offset from the bottom section 44. For example, the stepped portion 48 may be angled relative to the bottom section 44 and the top section 46 such that the bottom section 44 is a greater distance from the second surface 62 of the body 16 than the top section 46.

Additionally, the plate 40 may be a rigid body or a body that permits flexing. In examples where the stepped portion 48 of the plate 40 is a rigid body, the offset relationship between the bottom section 44 and the top section 46 may be fixed such that the offset relationship between the bottom section 44 and the top section 46 is relatively static. In examples where the stepped section 48 is the body 16 that permits flexing, the bottom section 44 and the top section 46 may be generally parallel to one another in one condition, and the bottom section 44 and the top section 46 may be angled relative to the other section 44, 46 in another condition. For example, if a force directed towards the body 16 is applied to the bottom section 44 or the top section 46, the stepped section 48 may permit flex such that the section 44, 46. With the force being applied is angled relative to the other section 44, 46. It is also generally contemplated that the plate 40 may be constructed of various materials, such as a metal, a composite, a polymer, or a combination thereof. For example, the plate 40 may be constructed of a spring-tensioned metal. In such examples, the spring-tension may be such that a force is applied on one or more sections 44, 46, 48 of the plate 40 results in an opposing force acting on one or more sections 44, 46, 48 of the plate 40.

According to various examples, the plate 40 may function as an alignment plate. In such examples, the plate 40 may operably receive the pair of pins 54 through the pair of apertures 42. Once the pins 54 are inserted into the apertures 42, the plate 40 may align the threaded section 100 with the slotted bolt aperture 36 defined on the body 16 such that the bolt 24 may be inserted into the bushing 18, through the body 16, and engage with the threaded section 100. Furthermore, by pre-defining the position of the bolt 24, the plate 40 may be configured to adjust and/or determine a linear or vertical position of the control arm 12 relative to a length of the control arm 12 or perpendicular to a length of the bolt 24, as provided herein. According to other examples, the plate 40 may function as a flag nut plate. In such examples, the plate 40 may be positioned relative to the body 16 such that a tightening of the flag nut 38 results in a force acting upon the plate 40, which then causes the plate 40 to bias against the body 16 and provide a force that assists in holding the flag nut 38 in place.

Figure 4:
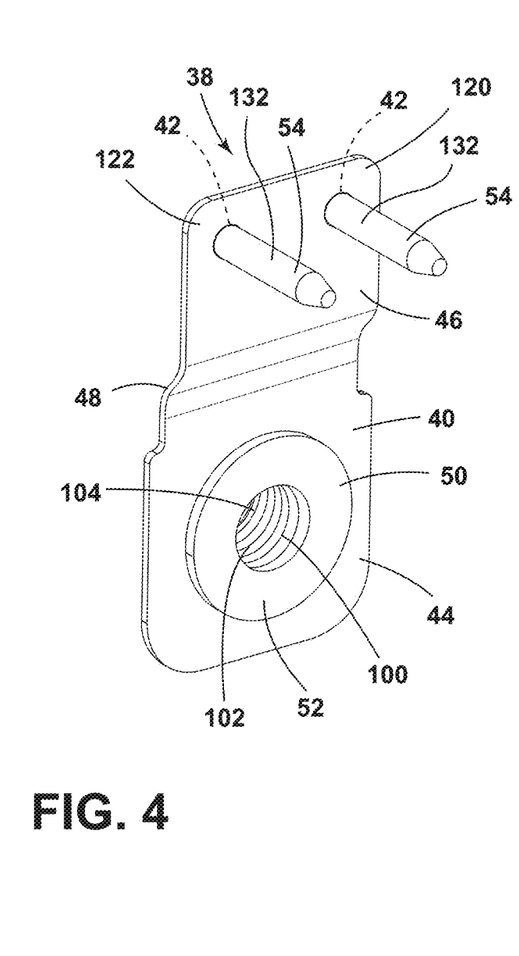
FIG. 4 is a rear perspective view of a flag nut of an alignment assembly, according to one example.

Referring to FIG. 4, the flag nut 38 includes the spacer 50. The spacer 50 may be integrally coupled to the flag nut 38. In some examples, the spacer 50 may be coupled to the bottom section 44 of the plate. 40 In other examples, the spacer 50 may be coupled to the inner surface 52 of the flag nut 38. For example, the spacer 50 may be integrally coupled to the bottom section 44 of the plate 40 and extend outward from the inner surface 52. According to various examples, the spacer 50 is configured to abut the second surface 62 of the body 16. Additionally, in other examples, the spacer 50 provides an offset relationship between the bottom section 44 and the second surface 62 of the body 16. In such examples, the spacer 50 may have a thickness that corresponds to an offset relationship between the bottom section 44 and the top section 46, which is defined by the stepped section 48. For example, the offset relationship provided by the stepped section 48 may result in the bottom section 44 being spaced apart from the second surface 62 and the top section 46 abutting the second surface 62. The spacer 50, to maintain the offset position of the bottom section 44 and the top section 46, may have a thickness that permits the bottom section 44 to be spaced apart from the second surface 62 and the top section 46 to abut the second surface 62. Additionally, it is generally contemplated that the spacer 50 may have varying thicknesses and sizes, such that the sections 44, 46, 48 of the plate 40 may vary in distance from the second surface 62.

Referring further to FIGS. 1-3 and 5, the alignment assembly 10 includes the second nut 84. The second nut 84 may include threading 110 defined along an inner segment 112 of the second nut 84. In some examples, the threading 110 of the second nut 84 may engage with the threading 110 defined on the end portion 28 of the bolt 24 such that the second nut 84 is mechanically coupled to the end portion 28 of the bolt 24. In other examples, the second nut 84 may abut an outer surface 114 of the plate 40. It is generally contemplated that the second nut 84 may be one of various kinds of nuts, such as a hexagonal nut, a torque nut, a wing nut, and various other nuts. According to various aspects, the second nut 84 is configured to apply a force directed towards the body 16 as the second nut 84 is tightened onto the end portion 28 of the bolt 24.

Figure 3:
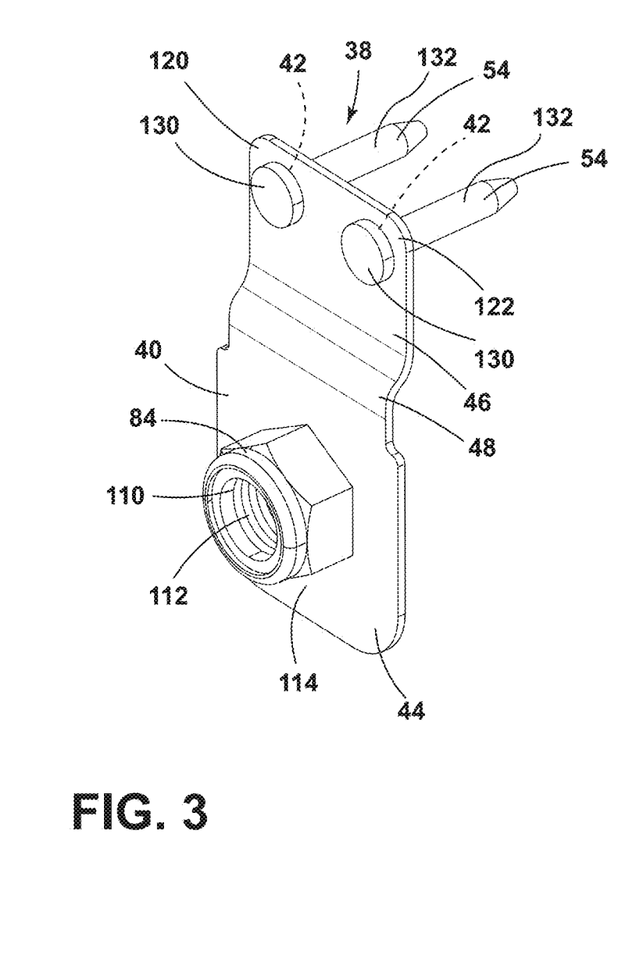
FIG. 3 is a front perspective view of a flag nut of an alignment assembly, according to one example.
Figure 5:
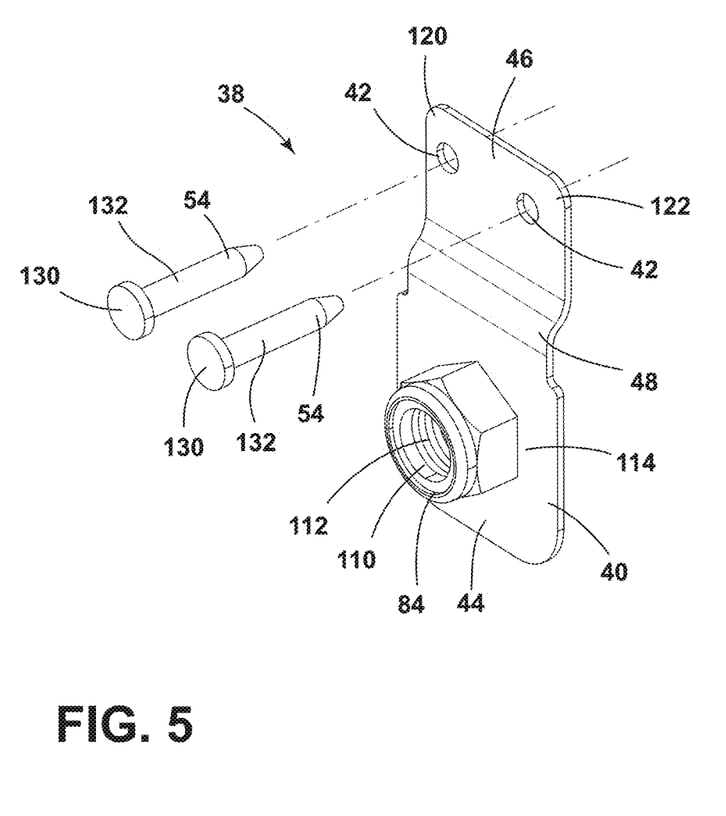
FIG. 5 is a partially exploded, front perspective view of a flag nut with a first pin and a second pin, according to one example.

Referring to FIGS. 3-5, the plate 40 may include the pair of apertures 42 defined on the plate 40. The pair of apertures 42 may extend from the outer surface 114 to the inner surface 52. In some examples, the pair of apertures 42 may be defined on the top section 46 of the plate 40. For example, the pair of apertures 42 may each be defined at a first corner 120 and a second corner 122 of the top section 46. Additionally, the pair of apertures 42 may be defined at various locations along the plate 40. It is also generally contemplated that the plate 40 may define a varying number of apertures. For example, the plate 40 may define a single aperture, three apertures, or more apertures. In other examples, the plate 40 may define a first pair of apertures 42 and one or more additional pairs of apertures 42 that are proximate to the first pair of apertures 42. For example, the plate 40 may define the first pair of apertures 42 and a second pair of apertures 42 proximate the first pair of apertures 42 such that each of the second pair of apertures 42 are proximate each of the first pair of apertures 42. In such examples, the flag nut 38 may be shifted such that the pair of pins 54 may be inserted into either of the pair of apertures 42. Additionally, in such examples, the pairs of apertures 42 may be positioned such that the threaded section 100 may be operably located at different positions along the slotted bolt aperture 36. For example, the first pair of apertures 42 may be positioned such that the threaded section 100 is positioned on a first end of the bolt aperture 36 and the second pair of apertures 42 may be positioned such that the threaded section 100 may be positioned on a second, opposing end of the bolt aperture 36.

In some examples, the pair of apertures 42 may define a width that corresponds to a width of the pair of pin apertures 56 defined on the body 16. In other examples, the pair of apertures 42 may each define a center point that aligns with a center point of each of the pair of pin apertures 56 such that a continuous opening is defined when the plate 40 is at least partially abutting the body 16. According to various aspects, the pair of apertures 42 are configured to receive the pair of pins 54 and permit extension of the pair of pins 54 through the plate 40. Additionally, or alternatively, it is generally contemplated that the pair of apertures 42 may define various widths and shapes. For example, the pair of apertures 42 may have a width that permits linear insertion of the pair of pins 54 into the plate 40, or the pair of apertures 42 may have a width that permits linear or angled insertion of the pair of pins 54 into the plate 40.

Referring to FIGS. 1-5, the alignment assembly 10 includes the pair of pins 54. In some examples, the pair of pins 54 may be coupled to the plate 40 and extend through the pair of apertures 42 defined on the plate 40 and the pair of pin apertures 56 defined on the body 16. According to some examples, each of the pair of pins 54 include a head 130 and a stem 132 extending from the head 130. As illustrated in FIG. 5, the head 130 may have a greater width than the stem 132 and may abut the outer surface 114 of the plate 40. The stem 132 may have a width that is less than a width of the pair of apertures 42 and the pair of pin apertures 56 and may extend through the pair of apertures 42 and the pair of pin apertures 56. According to various aspects, the pair of pins 54 are configured to extend through the plate 40 and engage with the body 16 such that the bolt aperture 36 is aligned with the threaded section 100 and the bolt 24 may be inserted through the bushing aperture 20, the bolt aperture 36, and engage with the threaded section 100.

In operation of an exemplary embodiment of the alignment assembly 10, the alignment assembly 10 may initially be in a disassembled condition. In the disassembled condition, the bolt 24 is spaced apart from the bushing 18, the body 16, the flag nut 38, and the second nut 84. Also, in the disassembled position, the flag nut 38 is decoupled from the body 16, the pair of pins 54 are decoupled from the plate 40, and a position of the control arm 12 is unaffected.

A user desiring to assemble the alignment assembly 10, align the bolt 24, and later adjust the control arm 12 and degree of camber, caster, and/or toe in a wheel hub, may first align the plate 40 with the body 16 such that the pair of pin apertures 56 generally align with the pair of apertures 42. The user may then insert each of the pair of pins 54 into the pair of apertures 42 and then into the pair of pin apertures 56. Once the pair of pins 54 are inserted, the threaded section 100 is aligned with the bolt aperture 36 and a general pre-defined position of the bolt 24 is determined. The bushing aperture 20 may then be aligned with the bolt aperture 36 and the threaded section 100. The bolt 24 may then be inserted through the bushing aperture 20, the bolt aperture 36, and may engage with the threaded section 100.

The user, desiring to adjust camber, caster, and/or toe on a wheel hub, may adjust a position of the control arm 12 by tightening the bolt 24. As the bolt 24 tightens and the threading 82 on the end portion 28 engages the threaded section 100 and the second nut 84, a force is directed on the plate 40 such that the plate 40 biases against the body 16, and the flag nut 38 and the second nut 84 are held in place. Additionally, as the bolt 24, the flag nut 38, and the second nut 84 tighten against one another, the position of the control arm 12 is adjusted as bolt 24 contacts the bushing 18 and either pulls or pushes the control arm 12 in a direction generally parallel with a length of the control arm 12. As the control arm 12 is adjusted in position, a wheel hub connected to the second end 21 of the control arm undergoes a change in orientation due to the change in position of the control arm 12 such that camber, caster, and/or toe of the wheel hub is adjusted. It is also generally contemplated, that the change in position and/or orientation of the wheel hub may be at least partially determined by the coupling point between the second end 21 of the control arm 12 and the wheel hub. For example, if the control arm 12 is coupled to a top portion of a wheel hub, a linear movement of the control arm 12 towards the wheel hub may adjust camber such that the wheel hub bottom section is angled inward relative to the top portion. In another example, if the control arm 12 is coupled to a bottom portion of a wheel hub, a linear movement of the control arm 12 towards the wheel hub would adjust camber such that the wheel hub bottom section is angled outward relative to the top portion. Additionally, a user, desiring to adjust the position of the control arm 12, and subsequently camber, caster, and/or toe of the wheel hub, to varying degrees, may tighten or loosen the bolt 24 and position the flag nut 38 in varying positions until a desired control arm 12 position is achieved.

Use of the presently disclosed device may provide for a variety of advantages. For example, the use of the plate 40 as both an alignment plate and the plate 40 in the flag nut 38 removes the issue of binding that may occur between an alignment plate on one side of the control arm 12 and the bushing 18, and the flag nut 38 on an opposing side of the control arm 12 and the bushing 18. Additionally, the use of a single plate 40 that functions as both an alignment plate and flag nut plate 40 reduces the number of components needed to adjust the control arm 12 position. Further, the use of the pair of pins 54, flag nut 38, and the second nut 84 allows for adjustment of the bolt 24 position as the alignment assembly 10 is being assembled. This advantage in turn allows for better camber, caster, or toe control as a traditional bolt 24 neck is not being used to position the control arm 12. Instead, the control arm 12 position is being determined by the flag nut 38, the second nut 84, and the pair of pins 54.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle 14) such that the component may function in any manner described herein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An alignment assembly for a vehicle, comprising:
   a body defining a bolt aperture and at least one pin aperture;
   a bushing at an end of a control arm and proximate the body, the bushing defining a bushing aperture that extends through the bushing;
   a bolt extending through the bushing aperture and the bolt aperture;
   a flag nut coupled to the bolt, the flag nut comprising a plate, the plate defining at least one aperture; and
   at least one pin extending through the at least one pin aperture and the at least one aperture, wherein the position of the at least one pin at least partially determines a position of the control arm.

2. The alignment assembly of claim 1, further comprising a second nut coupled to the bolt and proximate the plate, wherein the second nut is configured to apply a force on the plate, and wherein a position of the plate at least partially determines the position of the control arm.

3. The alignment assembly of claim 2, wherein the plate comprises an outer surface and an inner surface, the outer surface abutting the second nut and the inner surface abutting the body.

4. The alignment assembly of claim 3, further comprising a spacer coupled to the inner surface.

5. The alignment assembly of claim 1, wherein the at least one aperture comprises a first aperture and a second aperture, and wherein the at least one pin comprises a first pin and a second pin, and wherein the first aperture is configured to receive the first pin and the second aperture is configured to receive the second pin.

6. The alignment assembly of claim 1, wherein the plate includes a bottom section, a top section, and a stepped section defined between the bottom section and the top section.

7. The alignment assembly of claim 6, wherein the first aperture and the second aperture are defined at the top section.

8. The alignment assembly of claim 7, wherein the top section defines a first corner and a second corner opposing the first corner, and wherein the first aperture is defined proximate the first corner and the second aperture is defined proximate the second corner.

9. The alignment assembly of claim 1, wherein the body is a vehicle frame.

10. An alignment assembly for a vehicle, the alignment assembly comprising:
    a vehicle frame defining a bolt aperture and at least one pin aperture;
    a bushing at an end of a control arm and proximate the vehicle frame, the bushing defining
    a bushing aperture extending through a center portion of the bushing;
    a bolt extending through the bushing aperture, the bolt comprising a front portion and an end portion opposing the front portion, wherein the front portion comprises a bolt head with a bottom surface that is configured to abut a first end surface of the bushing, and wherein the end portion is configured to extend through the bolt aperture;
    a flag nut coupled to the end portion, the flag nut comprising a plate, the plate defining at least one aperture; and
    at least one pin extending through the at least one pin aperture and the at least one aperture, wherein a position of the at least one pin at least partially determines a position of the control arm.

11. The alignment assembly of claim 10, further comprising a second nut coupled to the end portion and proximate the plate, wherein the second nut is configured to apply a force on the plate, and a position of the plate at least partially determines the position of the control arm.

12. The alignment assembly of claim 10, wherein the plate comprises a bottom section, a top section, and a stepped section defined between the bottom section and the top section.

13. The alignment assembly of claim 12, wherein the at least one aperture comprises a first aperture and a second aperture, and wherein the at least one pin comprises a first pin and a second pin, and wherein the first aperture is configured to receive the first pin and the second aperture is configured to receive the second pin.

14. The alignment assembly of claim 13, wherein the first aperture and the second aperture are defined at the top section.

15. The alignment assembly of claim 14, wherein the top section defines a first corner and a second corner opposing the first corner, and wherein the first aperture is defined proximate the first corner and the second aperture is defined proximate the second corner.

16. A vehicle, comprising:
    a vehicle frame defining a bolt aperture and a pair of pin apertures;
    a control arm proximate the vehicle frame;
    a bushing at an end of the control arm, the bushing defining a bushing aperture extending through a center portion of the bushing;
    a bolt extending through the bushing aperture, the bolt comprising a front portion and an end portion opposing the front portion, wherein the front portion comprises a bolt head with a bottom surface that is configured to abut a first end surface of the bushing, and wherein the end portion is configured to extend through the bolt aperture;
    a flag nut coupled to the end portion, the flag nut comprising a plate defining a pair of apertures, wherein the plate includes a bottom section, a top section, a stepped section defined between the bottom section and the top section, and a spacer integrally coupled to an inner surface of the plate; and a pair of pins extending through the pair of pin apertures and the pair of apertures, wherein a position of each of the pair of pins at least partially determines a position of the control arm.

17. The vehicle of claim 16, wherein the top section and the spacer are configured to abut the vehicle frame.

18. The vehicle of claim 17, further comprising a second nut coupled to the end portion and proximate the plate, wherein the second nut is configured to apply a force on the plate, and wherein a position of the plate at least partially determines the position of the control arm.

19. The vehicle of claim 18, wherein the plate comprises an outer surface and an inner surface, the outer surface abutting the second nut.

20. The vehicle of claim 19, wherein the top section defines a first corner and a second corner opposing the first corner, and wherein each of the pair of apertures are respectively defined proximate the first corner and the second corner.

\* \* \* \* \*